July 22, 1958   C. L. BURNETT   2,844,389
BOAT TRAILER DOLLY
Filed March 4, 1957
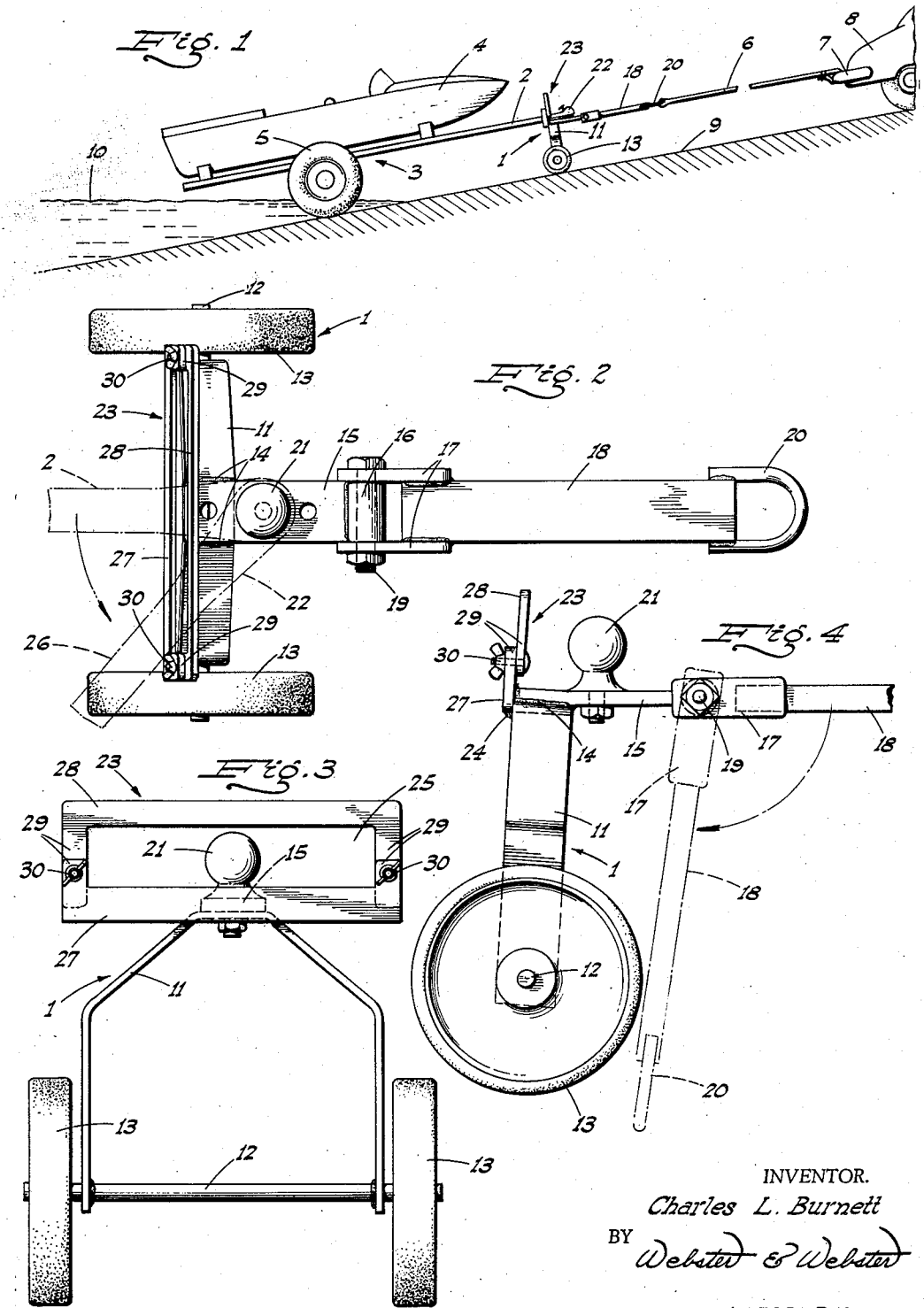
INVENTOR.
Charles L. Burnett
BY Webster & Webster
ATTORNEYS

2,844,389
BOAT TRAILER DOLLY

Charles L. Burnett, Folsom, Calif.

Application March 4, 1957, Serial No. 643,670

3 Claims. (Cl. 280—476)

This invention relates to—and it is a major object to provide, as a removable accessory or attachment—a novel dolly adapted for use with a boat trailer.

Boat trailers conventionally have a forwardly projecting tongue adapted to be coupled by a ball and socket hitch or the like to the rear of an automobile, whereby the trailer is towed to transport the boat from point to point.

To launch or pick up the boat, the trailer is backed into the water to a depth such that the boat may float off—or onto—the trailer, as the case may be; the automobile then running forward to pull the trailer out of the water and up the bank or launching ramp. Sometimes—because of shallow water near the bank, or too steep a bank or launching ramp—the automobile, with the trailer direct-connected, cannot back close enough to the water for the successful and convenient accomplishment of the launching or pick-up operation.

In such a case it is the practice to connect a flexible member, such as a rope or cable, between the rear of the automobile and the forward end of the trailer tongue; this to the end that the trailer can be run into and out of the water by the automobile while the latter remains at a safe distance, and where adequate traction can be had.

The above practice does, however, present a problem in that unless the trailer tongue is front-end supported it drags the ground, with the chance of being caught or damaged, and further control of the trailer is difficult to maintain.

It is therefore another important object of this invention to provide a boat trailer dolly which is adapted for connection with and to support the trailer tongue during boat launching or subsequent pick-up operations.

It is a further object of this invention to provide a boat trailer dolly, for the purpose described, which is initially separate; which is adapted to be connected to the conventional hitch socket at the forward end of the trailer tongue; and which—when not in use—can be readily folded and carried in the boat on the trailer, or in the trunk or baggage compartment of the automobile.

An additional object of the invention is to provide a boat trailer dolly, as above, which includes a novel guide frame through which the trailer dolly projects when the dolly is attached to said tongue for use; such guide frame not only stabilizing the dolly, but preventing jack-knifing between the same and the trailer.

It is also an object of the invention to produce a boat trailer dolly which is simple in structure, capable of easy and conomical manufacture, and very convenient to use.

Still another object of the invention is to provide a practical, reliable, and durable boat trailer dolly, and one which will be exceedingly effective for the purpose for which it is designed.

These objcts are accomplished by means of such structure and relative arrangement of parts as will fully appear by a perusal of the following specification and claims.

In the drawings:

Fig. 1 is an elevation showing the boat trailer dolly in use; the flexible member, as connected betwen the dolly and the automobile, being foreshortened.

Fig. 2 is an enlarged plan view of the dolly.

Fig. 3 is a rear end elevation of the dolly.

Fig. 4 is a side elevation of the dolly, with the foldable stub tongue shown in full lines in its forwardly projecting position for use, and in broken lines in its folded or transport position.

Referring now more particularly to the drawings, and to the characters of reference marked thereon, the novel, boat trailer dolly is indicated generally at 1, and when in use occupies the position shown in Fig. 1; such dolly being removably secured—as will hereinafter appear—to the forward end of the tongue 2 of a trailer 3 carrying a boat 4, the wheels of the trailer 3 being indicated at 5.

A flexible member 6, such as a rope or cable, is connected between the dolly 1 and the rear bumper structure 7 of the automobile 8. With this arrangement the automobile 8 may stand at a point a substantial distance up the bank or launching ramp 9, and yet a sufficiently safe distance to back the trailer 3 into the water 10 for floating the boat 4 off—or onto—said trailer. Thereafter, with the automobile still having adequate traction at a safe point it can readily pull the trailer out of the water and up said bank or ramp.

The boat trailer dolly 1, used as above described, is constructed in detail in the manner shown in Figs. 2–4 inclusive; such dolly—by reference to the positions of the parts when in use—comprising the following structure:

An upstanding, transversely extending A-frame 11 is fitted at the lower end with an axle 12 whose ends project beyond the sides of said frame 11 and there carry wheels 13.

At the upper end or apex of the A-frame 11 it is welded, as at 14, to the rear end of a relatively short forwardly projecting bar 15, which may be considered as being a part of the frame. At the front end thereof the bar 15 is formed with a transverse sleeve 16 straddled by a clevis 17 on the rear end of a stub tongue 18; such clevis 17 being pivotally connected to the sleeve 16 by a cross bolt 19.

The stub tongue 18 projects forwardly from the bar 15 and at its front end said stub tongue is fitted with an attachment eye 20; such eye being the means of which the flexible member 6 is connected to the dolly 1.

Intermediate the ends thereof the bar 15 is fitted—on top—with a hitch ball 21 adapted to receive the hitch socket 22 (see Fig. 1) on the forward end of the trailer tongue 2.

Also, at the top or apex of the A-frame 11, but spaced rearwardly of the hitch ball 21, there is a vertically disposed, transversely extending guide frame, indicated generally at 23, which is welded to said A-frame, as at 24; such guide frame being open in a manner to form a transversely elongated, horizontal guide slot 25 directly to the rear of—and horizontally substantially alined with—the hitch ball 21.

When the dolly 1 is in use the trailer tongue 2 projects through the slot 25 of guide frame 23; such guide frame not only stabilizing the dolly against forward or rearward collapse or vertical buckling, but also preventing jack-knifing between said dolly and the trailer tongue 2. The limit of the angularity which the trailer tongue 2 can assume with respect to the dolly 1, or the extent that such tongue can relatively swing from a true longitudinal position, is indicated in broken lines in Fig. 2, as at 26.

When the dolly 1 is being attached to—or removed from—the trailer tongue 2 it is necessary that the latter be released from the guide frame 23, and this is accomplished by making such guide frame sectional, as follows:

The guide frame 23 comprises a shallow, elongated U-shaped lower section 27, which is the part secured to the A-frame 11, and a shallow, inverted elongated U-shaped upper section 28; the end legs 29 of said sections 27 and 28 being lapped and separably secured together by wing-nut type bolts 30.

By the simple expedient of loosening and removing at least one of the bolts 30 the upper section 28 can be easily moved to a position so that the trailer tongue 2 can be placed in—or withdrawn from—said guide frame 23.

When the described dolly 1 is not in use and has been removed from the trailer tongue 2, the stub tongue 18 of said dolly is folded toward the A-frame 11, as shown in broken lines in Fig. 4; the dolly then being a very compact structure which can be transported without occupying too great a space.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A detachable dolly for supporting the forwardly projecting tongue of a trailer, comprising an upstanding wheel-supported frame, means to couple the frame to a flexible pull member, disengageable connecting means between the tongue and dolly comprising a hitch element on the forward end of the tongue and a cooperating hitch element on the top of the frame, and a horizontal tongue guide mounted on the frame rearwardly of said cooperating hitch element and comprising a structure defining a transversely extending, vertically narrow slot through which the tongue projects; said guide structure including a shallow U-shaped lower section, a shallow inverted U-shaped upper section, said sections having corresponding end legs which lap, and bolts connecting the lapping legs of said sections.

2. A detachable dolly for supporting the forwardly projecting tongue of a trailer, comprising an upstanding wheel-supported frame which includes a top forwardly projecting bar, means to couple the bar at the front to a flexible pull member, a hitch ball mounted on and upstanding from the bar, the tongue having a hitch socket thereon at its forward end for detachable engagement on said hitch ball, and a tongue guide structure fixed in connection with the frame rearwardly of said hitch ball and defining a transverse slot through which the adjacent portion of the tongue extends; the guide structure including a part normally defining a portion of the slot, but being detachable for removal of the trailer tongue from, or placement in, said slot.

3. A detachable dolly for supporting the forwardly projecting tongue of a trailer, comprising a frame adapted to upstand, transversely spaced ground engaging wheels on the frame, a short horizontal bar fixed to the upper end of the frame and projecting forwardly therefrom, a stub tongue transversely pivotally connected at the rear end to the front end of the bar, the stub tongue being swingable from a forwardly projecting position to a position folded relative to the frame, means on the front end of the stub tongue for connection to a flexible pull member, an upstanding transversely extending guide structure on the frame adjacent the rear of the bar, said structure defining a transversely elongated vertically narrow slot, the trailer tongue projecting through said slot, the front end of the trailer tongue overhanging the bar, and a detachable swivel hitch connecting the front end of the trailer tongue and said bar.

References Cited in the file of this patent

UNITED STATES PATENTS

| | | |
|---|---|---|
| 1,221,608 | Schroeder | Apr. 3, 1917 |

FOREIGN PATENTS

| | | |
|---|---|---|
| 673,225 | France | Oct. 7, 1929 |